United States Patent
Santhosh Kumar et al.

(10) Patent No.: US 12,147,777 B2
(45) Date of Patent: Nov. 19, 2024

(54) EXPERIENCE BASED DISPATCH OF REGULATED WORKLOADS IN A CLOUD ENVIRONMENT

(71) Applicant: International Business Machines Corporation, Armonk, NY (US)

(72) Inventors: Sthanikam Santhosh Kumar, Punganuru (IN); Meena A, Bangalore (IN); Supriya Devidutta, Bhubaneswar (IN); Koosappa M, Bangalore (IN); Manish Kumar Dash, Khallikote (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 18/072,940

(22) Filed: Dec. 1, 2022

(65) Prior Publication Data
US 2024/0184534 A1    Jun. 6, 2024

(51) Int. Cl.
*G06F 40/47* (2020.01)
*G06F 8/30* (2018.01)
(Continued)

(52) U.S. Cl.
CPC ............. *G06F 40/47* (2020.01); *G06F 8/30* (2013.01); *G06F 8/51* (2013.01); *G06F 8/10* (2013.01);
(Continued)

(58) Field of Classification Search
CPC ...... G06V 20/47; G06Q 30/06; G06Q 10/067; G06F 40/154; G06F 40/45; G06F 40/44;
(Continued)

(56) References Cited

U.S. PATENT DOCUMENTS 7,925,675 B2    4/2011  Stark et al.
11,217,136 B2   1/2022  Noh et al.
(Continued)

FOREIGN PATENT DOCUMENTS

CN    107908394 B    3/2020

OTHER PUBLICATIONS

Anonymously, , "A method for EDI Layout Prescription and Auto-Mapping", IP.com No. IPCOM000256101D IP.com Electronic Publication Date: Nov. 3, 2018, 6 pages.
(Continued)

*Primary Examiner* — Tuan A Vu
(74) *Attorney, Agent, or Firm* — Stephen J. Walder, Jr.; Andre L. Adkins (57) ABSTRACT

Mechanisms are provided for generating electronic data interchange mapping source code. A source code generator, comprising a machine learning trained neural network computer model, receives input data comprising a source document data structure in a first format and a destination document data structure in a second format, different from the first format. The source code generator processes the input data to generate a source code sequence output vector. A source code is generated that maps contents of source documents in the first format to contents of destination documents in the second format based on the source code sequence output vector. The source code is output to a computing device for execution on other source documents that utilize the first format to thereby automatically generate corresponding destination documents in the second format.

18 Claims, 7 Drawing Sheets

(51) Int. Cl.
*G06F 8/51* (2018.01)
*G06F 8/10* (2018.01)
*G06F 8/36* (2018.01)
*G06F 40/154* (2020.01)
*G06F 40/40* (2020.01)
*G06F 40/44* (2020.01)
*G06F 40/45* (2020.01)
*G06F 40/58* (2020.01)
*G06Q 10/067* (2023.01)
*G06Q 30/06* (2023.01)
*G06V 20/40* (2022.01)

(52) U.S. Cl.
CPC .............. *G06F 8/36* (2013.01); *G06F 40/154* (2020.01); *G06F 40/40* (2020.01); *G06F 40/44* (2020.01); *G06F 40/45* (2020.01); *G06F 40/58* (2020.01); *G06Q 10/067* (2013.01); *G06Q 30/06* (2013.01); *G06V 20/47* (2022.01)

(58) Field of Classification Search
CPC . G06F 8/30; G06F 40/47; G06F 40/40; G06F 40/58; G06F 8/51; G06F 8/36; G06F 8/10
See application file for complete search history.

(56) References Cited

U.S. PATENT DOCUMENTS

| | | | |
|---|---|---|---|
| 2002/0049815 A1* | 4/2002 | Dattatri | G06Q 30/06 709/206 |
| 2002/0129059 A1 | 9/2002 | Eck | |
| 2003/0121001 A1 | 6/2003 | Jeannette et al. | |
| 2003/0158805 A1 | 8/2003 | Mozhdehi et al. | |
| 2005/0257193 A1 | 11/2005 | Falk et al. | |
| 2007/0061713 A1* | 3/2007 | Chidlovskii | G06F 40/154 707/999.1 |
| 2011/0173346 A1 | 7/2011 | Neben | |
| 2019/0018659 A1 | 1/2019 | Falk et al. | |
| 2020/0293724 A1* | 9/2020 | Wang | G06F 40/44 |
| 2022/0036260 A1* | 2/2022 | Krishnan | G06Q 10/067 |
| 2023/0325609 A1* | 10/2023 | Chandler | G06F 40/45 704/2 |
| 2024/0121125 A1* | 4/2024 | Blair | G06V 20/47 |

OTHER PUBLICATIONS

Keskar, Nitish S. et al., "CTRL: A Conditional Transformer Language Model for Controllable Generation", arXiv:1909.05858v2 [cs.CL], Sep. 20, 2019, 18 pages.

Rifaieh, Rami et al., "An Analysis of EDI Message Translation and Message Integration Problems", International Conference on Computer Science, Software Engineering, Information Technology, e-Business, and Applications (CSITeA'03), Jun. 2003, 10 pages.

* cited by examiner

FIG. 1

```
<?xml version="1.0" encoding="UTF-8"?>
<!DOCTYPE cXML SYSTEM "http://xml.cxml.org/schemas/cXML/1.2.044/cXML.dtd">
<cXML payloadID="1666768158009.1676460239.000004122@miN5JFewapivrouGy+bSBE0+Rio=" timestamp="2022-10-26T00:09:18-07:00" version="1.2.044" xml:lang="en-US"><Header>
<From>                                              210
<Credential domain="NetworkID">                     220
<Identity>AN01059294194</Identity>
</Credential>
<Credential domain="SystemID">
<Identity>GP0</Identity>
</Credential>
</From>
<To>
<Credential domain="NetworkID">
<Identity>AN01000312448</Identity>
</Credential>
</To>
<Sender>
<Credential domain="AribaNetworkUserId">
<Identity>sysadmin@ariba.com</Identity>
<SharedSecret>ariba2002</SharedSecret></Credential>
<UserAgent>Buyer 14s2</UserAgent>
</Sender>
</Header>
<Request deploymentMode="production">
<StatusUpdateRequest>
<DocumentReference payloadID="1666767905920-4334301354764825054@10.162.97.181"></DocumentReference>
<Status text="" code="200"></Status>
<InvoiceStatus type="processing">
<InvoiceIDInfo invoiceDate="2022-10-22T03:30:00-07:00" invoiceID="92252726"></InvoiceIDInfo>
<Comments xml:lang="en">
</Comments>
</InvoiceStatus>
</StatusUpdateRequest>
</Request>
</cXML>
```

*FIG. 2*

```
<?xml version="1.0" encoding="UTF-8" standalone="yes" ?>
<InvoiceStatus>
<CustomerID>AN01059294194</CustomerID>          ⌐310
<IBM_ID>AN01000312448</IBM_ID>
<Invoice_Status_Date>2022-10-26 00:09:18</Invoice_Status_Date>
<Invoice_Number>92252726</Invoice_Number>
<Invoice_Date>2022-10-22 03:30:00</Invoice_Date>
<Status>Sent</Status>
</InvoiceStatus>
```

*FIG. 3*

1. If the Input Data contains NetworkID or DUNS then Map the value of Identity from input Data to CustomerID on the Output Side;
2. If the Input Data contains NetworkID or DUNS then Map the value of Identity from Input Data to ReceiverID on the Output Side;
3. Map the Invoice date MM-DD-YYYY to the invoice date DD-MM-YYYY;
4. Map the InvoiceID to the Invoice Number;
5. Map Timestamp to the Invoice Status Date;
...

| FIG. 5A |
|---------|
| FIG. 5B |

```
from bs4 import BeautifulSoup
from xml.dom import minidom
import os root = minidom.Document()
fd = open('INPUT.dat', 'r')

xml_file = fd.read()

soup = BeautifulSoup(xml_file,features="xml")

xml = root.createElement('InvoiceStatus')
root.appendChild(xml)

for tag in (soup.find('From').findAll('Credential')):
    if tag['domain'] == "NetworkID":
        productChild = root.createElement('CustomerID')
        text= root.createTextNode(tag.Identity.text)
        productChild.appendChild(text)
        xml.appendChild(productChild)

for tag in (soup.find('To').findAll('Credential')):
```

FIG. 5A

```
if tag['domain'] == "NetworkID":
    productChild = root.createElement('IBM_ID')
    text= root.createTextNode(tag.Identity.text)
    productChild.appendChild(text)
    xml.appendChild(productChild)

productChild = root.createElement('Invocie_status_Date')
text= root.createTextNode(soup.find('cXML')['timestamp'])
productChild.appendChild(text)
xml.appendChild(productChild)

productChild = root.createElement('Invocie_Number')
text= root.createTextNode(soup.find('InvoiceIDInfo')['invoiceID'])
productChild.appendChild(text)
xml.appendChild(productChild)

productChild = root.createElement('Invocie_Date')
text= root.createTextNode(soup.find('InvoiceIDInfo')['invoiceDate'])
productChild.appendChild(text)
xml.appendChild(productChild)

productChild = root.createElement('Status')
text= root.createTextNode("Sent")
productChild.appendChild(text)
xml.appendChild(productChild)
fd.close()
xml_str = root.toprettyxml(indent ="\t")

save_path_file = "OUTPUT.dat"

with open(save_path_file, "w") as f:
    f.write(xml_str)
```

EXPERIENCE BASED DISPATCH OF REGULATED WORKLOADS IN A CLOUD ENVIRONMENT

BACKGROUND

The present application relates generally to an improved data processing apparatus and method and more specifically to an improved computing tool and improved computing tool operations/functionality for automatically dispatching regulated and/or segmented workloads in a cloud computing environment based on previous experience and feedback.

Electronic Data Interchange (EDI) is the communication of electronic documents from the computing systems of one entity to another entity. In some instances, the implementation of EDI involves the use of a standard electronic format that replaces paper-based documents, such as purchase orders or invoices. By automating paper-based transactions, organizations can save time and eliminate costly errors caused by manual processing.

In EDI transactions, information moves directly from a computer application in one organization to a computer application in another. EDI standards define the location and order of information in a document format. With this automated capability, data can be shared rapidly instead of over hours, days or weeks as required when using paper documents or other methods. However, EDI requires that the entities involved abide by the agreed upon EDI standards or have some means of conversion to the EDI standard, such as via an EDI mapping solution. Thus, if an entity wishes to utilize their own formatting of electronic documents locally in their own computing systems, in order to communicate that information to another entity, they must be able to convert their local format to the standardized format, or the format of the receiving entity.

Today, industries use EDI integration to share a range of document types, from purchase orders to invoices to requests for quotations to loan applications and more. In most instances, these organizations are trading partners that exchange goods and services frequently as part of their supply chains and business-to-business (B2B) networks. However, EDI mapping may be required to be provided for each possible document type, format, and potential use at the receiving entity.

EDI mapping plays an important role in this process, where one format of a document is converted to another. However, the generation of such mapping is not a simple task and is a very labor intensive process involving much specialized knowledge and manual effort. Moreover, the mapping must be maintained over time as conditions change, formats of documents change, uses of the information in such documents change, and the like, and again requires the investment of labor and manual effort. As a result, EDI solutions tend to be provided by only a few providers for high licensing fees.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating electronic data interchange mapping source code. The method comprises receiving, in a source code generator comprising a machine learning trained neural network computer model, input data comprising a source document data structure in a first format and a destination document data structure in a second format, different from the first format. The method also comprises processing, by the source code generator, the input data to generate a source code sequence output vector. In addition, the method comprises generating a source code that maps contents of source documents in the first format to contents of destination documents in the second format based on the source code sequence output vector. Furthermore, the method comprises outputting the source code to a computing device for execution on other source documents that utilize the first format to thereby automatically generate corresponding destination documents in the second format.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 comprising FIGS. 5A and 5B is an example of an automatically generated source code for EDI mapping as may be generated by an automated EDI mapping source code generator computer model in accordance with one illustrative embodiment, where

DETAILED DESCRIPTION

As mentioned above, Electronic Data Interchange (EDI) mapping plays an important role in the EDI process, where one format of a document is converted to another so that the entities involved in the transfer of documentation are able to utilize the information contained therein with their own computing systems according to their own local formats. To illustrate this EDI mapping, it is first beneficial to appreciate the necessity of this information conversion. With EDI, an entity that wants to trade electronic documents with another entity, will either send those electronic documents in the format that is native to their respective computing system or application, e.g., an Enterprise Resource Planning (ERP) tool, or will send the electronic documents in one of the global standardized formats. However, the receiving entity may not necessarily follow the same standards as the sender. It is also very likely that the hierarchy of the tags and fields in the electronic document may be different from the hierarchy that the receiving entity can utilize or is expecting. Hence, to ensure the electronic document is understood by both the sending and receiving entities, translation of the electronic document from one format to another, without losing or misinterpreting any information is critical. Hereafter, the electronic documents will be referred to simply as "documents", but it should be understood that these "documents" are data structures storing information that may be conveyed through electronic means.

Conversion of documents exchanged electronically between two entities is not a simple task. The electronic document conversion from the source format of the sender entity, to a consumable format used by the recipient entity needs contemplation of usage scenarios, execution of several iterations of conversion and transfer, exchange of sample files (Input and Output), creation of Document type Definition files (DDF) for source and destination, and finally creating the map for doing translation from the source format to the destination format. Making this process even more complex is the fact that sometimes each of the sender and recipient entities may have different scenarios which require the creation of new maps, e.g., each entity may have different applications, computer systems, departments, individuals, or the like, that may need to utilize the information in an electronic document in a different way and may need the information provided in different formats to facilitate such.

Once the map is created, running and maintaining the map in production is very difficult as there is a high dependency on the mapping skills of human beings required to design and maintain the maps in the production environment. The whole process of creating a map and maintaining the map is time consuming and cost sensitive. It has been estimated that generating and maintaining the maps account for approximately 80% of the costs in generating and maintaining EDI solutions. Thus, there is a need for an improved automated computing tool that is capable of automatically generating and maintaining EDI mappings, while being dynamic with regard to changes in scenarios and usages of the documents and their formats between collaborating entities.

The illustrative embodiments provide an improved automated computing tool and improved computing tool operations/functionality that implements a conditional source code generation for defining a mapper to map documents from one format used by a sender entity, to a second format used by a recipient entity. Instead of designing a map from scratch using a commercial map editor, the illustrative embodiments automatically generate the source code in an open-source programming language which will translate from one EDI format to another. In this way, the labor intensive manual process of creating and maintaining the map in order to provide an EDI solution is eliminated and replaced with an automated computing tool. The automated computing tool provides improved functionality that automatically generates the necessary source code to perform the mapping, and automatically maintains that source code for mapping, so that the mapping may be automatically and dynamically updated for various scenarios, usages, and the like, that may be present for different elements of the entities or which may develop over time. Furthermore, as the present invention provides an automated improved computing tool that automatically generates and maintains this EDI mapping, the solution provided by the illustrative embodiments eliminates the strong dependencies on mapping skills of individuals to accomplish the EDI mapping and maintenance of the EDI mapping.

The illustrative embodiments train one or more conditional language artificial intelligence (AI) computer models for the specific task of generating source code that does the translation from one format to another format by considering scenarios defined as Mapping Requirement Specifications (MRS). The one or more conditional language AI computer models operate on three inputs, i.e., the source document, a destination document, and a MRS. The source document may be a sample of an EDI source transaction file, for example, such as an X12 standard formatted document sample. The destination document may be a sample of an EDI destination transaction file, for example, such as an EDIFACT formatted document sample. The MRS documents all the rules and logic involved in performing the translation from the source format to the destination format, e.g., X12 to EDIFACT in this example. Using these three inputs, the one or more conditional language AI computer models will generate automatically generate a source code that can translate the document from the source format to the destination format, e.g., X12 format to EDIFACT format.

The AI computer model architecture, in accordance with some illustrative embodiments, implements three encoders and one decoder, where these encoders and decoder may be recurrent neural networks (RNNs) for example. The RNNs will comprise attention based RNN layers along with a few linear and densely connected layers. It should be appreciated that the encoder-decoder architecture differs from other encoder-decoder architectures that generally comprise a single encoder and a single decoder. In such single encoder-decoder architectures, if there are multiple inputs, the inputs are concatenated before passing the concatenated data to the single encoder. The encoder then learns the total information contained in all the inputs and everything is combined in a single encoder output which is subsequently fed into the decoder as input.

Contrary to this single encoder-decoder architecture, the illustrative embodiments utilize a plurality of separate "expert" encoders. These encoders process different inputs separate and in parallel and create separate encodings. This ensures that the nuances in the different types of input are not lost through concatenation and combined processing through a single encoder. The output of these encoders is then fed to the decoder's input layer using a densely connected layer. Thus, the architecture of the illustrative embodiments significantly differs from single encoder-decoder architectures by using a stacked, multiple encoder-single decoder architectures, that improves the resulting output by avoiding loss of information in the encodings.

In some illustrative embodiments, this multiple encoder-single decoder architecture comprises three encoders and a decoder. With these illustrative embodiments, a first encoder encodes the source document file into a first fixed length vector output, or embedding. A second encoder encodes the destination document file into a second fixed length vector output, or embedding. The third encoder encodes the MRS specified translation rules and logic into a third fixed length vector output, or embedding. The vector outputs represent embeddings of the contents of the source document, destination document, and MRS rules/logic which may be passed as input to the decoder which generates the source code for mapping from the source document format to the destination document format in accordance with the rules/logic specified in the MRS. That is, the decoder combines the embedding vector outputs from the encoders and generates an output vector that is mapped to source code snippets such that the sequence of values in the vector output of the decoder represents a sequence of source code snippets that together provide the source code for mapping from the source document format to the destination document format in accordance with the rules of the MRS.

The encoders and decoder are trained through machine learning processes to generate the source code based on source documents, destination documents, and MRS rules/logic. For example, the training data samples of source documents, destination documents, and MRS rules/logic are input to the respective encoders, and the corresponding source code embeddings are generated. The generated embeddings are then passed to the decoder and a final output is generated. This final output compared to ground truth to determine a loss. The loss is then used by machine learning training logic, e.g., back-propagation, to update operational parameters with adjustments to the encoders and decoder to determine modified operational parameters that attempt to reduce the loss until a convergence criterion is achieved, e.g., a loss equal to or below a threshold loss or a predetermined number of training iterations/epochs are performed. In this way, the encoders and decoder learn a correlation between input patterns of text in the respective ones of the source document, destination document, and MRS, and corresponding source code that are output as the embedding vector outputs of the decoder.

Once the encoder-decoder model is trained through the machine learning process, the model may be provided as an AI service, such as via a cloud computing service or the like. In such an embodiment, users may make use of the cloud based AI service to generate source code for EDI translation or mapping. The user may send the source document or file, the MRS, and the destination document or file to the AI service, and the AI service will use the input documents/files and generate the source code for EDI translation and send it back to the user for execution in their computing systems. The generated source code can be deployed on any bare metal server or a hybrid cloud cluster or on the user's desktop computers in order to perform the translation of source documents from a first format used by the sender, to a second format used by the recipient, and will do so in accordance with the rules and logic specified in the MRS. This allows users to generate EDI mappings or translations automatically, and automatically maintain the EDI infrastructure with minimum effort at a low cost.

In some illustrative embodiments, different instances of the trained encoder-decoder model may be provided that are specific to the particular combination of source document format, destination document format, and MRS rules/logic. Thus, different instances of the encoder-decoder model may be trained for different combinations of source document format, destination document format, and MRS rules/logic. However, once an encoder-decoder model is trained, some modifications may be made to the MRS rules/logic and the encoder-decoder model may be retrained based on these modifications to thereby implement the modified rules/logic in the source code output by the encoder-decoder model. Similarly, modifications to the format of source document and destination document may likewise trigger a retraining of the encoder-decoder model for those specific formats. Such retraining may be triggered periodically or in response to events, such as an update to the source document format, update to the destination document format, or update to the MRS.

Thus, the illustrative embodiments provide an automated improved computer tool that implements artificial intelligence computer models to automatically generate source code for mapping or translating source document formats to destination document formats in accordance with mapping requirement specifications (MRS). The illustrative embodiments train an encoder-decoder computer model comprising three encoders and one decoder, to encode source documents, destination documents, and MRS, and generate a source code for mapping/translation from the source document format to the destination document format. The source code may be provided as an open source code such that it is not tied to any proprietary EDI tools which facilitates a low-cost and efficient hybrid solution for managing EDI infrastructures. Moreover, the illustrative embodiments are adaptable to the ever changing standards for document formatting, such as in the case of changing federal laws and legal mandates. The illustrative embodiments embed such changes in the MRS file which may then be used to retrain the encoder-decoder model of the AI service and thereby automatically implement the new laws and legal mandates in the resulting EDI mapping/translation source code.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As described above, the illustrative embodiments of the present invention are specifically directed to an improved computing tool that automatically generates source code for electronic data interchange (EDI) mapping/translation between a source document format and a destination document format, also referred to as a sender format and a recipient format. The source code may then be provided to the user for deployment such that the source code may be executed to translate a given source document in a first format, into a destination document in a second format, in accordance with rules and logic specified in a mapping requirements specification (MRS) file. The illustrative embodiments need not actually perform any mappings/translations of the formats, but instead automatically generates the source code that is capable of performing the mappings/translations when given a source document.

All of the functions of the illustrative embodiments as described herein are intended to be performed using automated processes without human intervention. While a human being, e.g., a user or customer, may initiate the operations of the automated AI computing tool of the illustrative embodiments, the logic and functions of the AI computing tool are performed specifically by the improved computing tool in an automated manner without further human intervention. Moreover, even though the present invention may provide an output of an EDI mapping/translation source code that may be executed at a user/customer location in the user/customer's computing systems, and thereby ultimately assists human beings in performing EDI operations with their EDI infrastructures, the illustrative embodiments of the present invention are not directed to actions performed by the human beings themselves, but rather to the specific operations performed by the specific improved computing tool of the present invention which automatically generates the source code that is executable in the user's/customer's EDI infrastructure to perform EDI mappings/translations, which ultimately assists the users/customers. Thus, the illustrative embodiments are not organizing any human activity, but are in fact directed to the automated logic and functionality of an improved computing tool, and specifically the automated and improved computing tool implementing specific trained artificial intelligence computer models.

Figure 1:
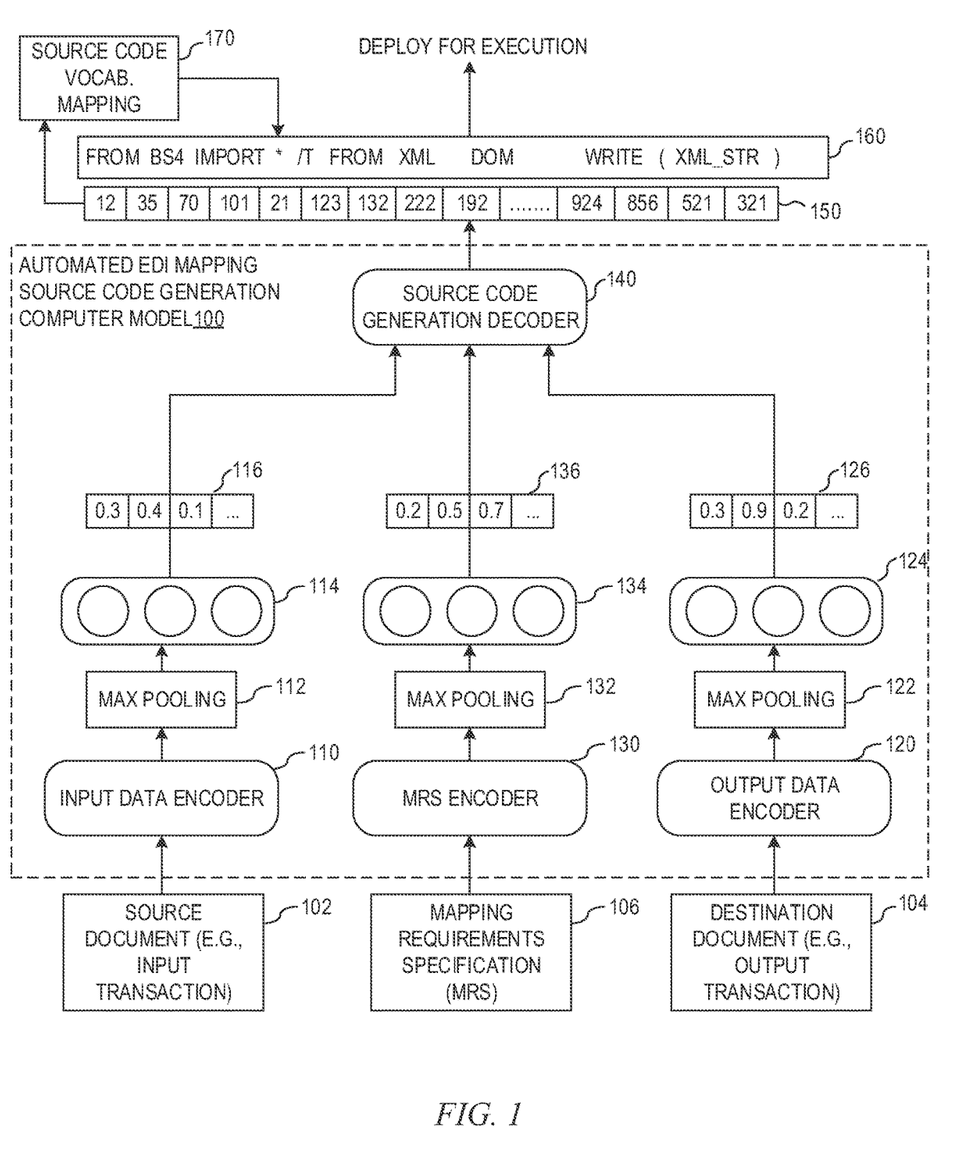
FIG. 1 is an example diagram of an automated EDI mapping source code generator computer model in accordance with one illustrative embodiment.

FIG. 1 is an example diagram of an automated EDI mapping source code generator computer model in accordance with one illustrative embodiment. As shown in FIG. 1, the automated EDI mapping source code generator computer model 100, hereafter simply referred to as the source code generator 100, comprises a source data encoder 110, a destination data encoder 120, a mapping requirements specification (MRS) encoder 130, and a source code generation decoder 140. The source code generator 100 is configured as an encoder-decoder recurrent neural network (RNN) computer model comprising the 3 encoders 110-130 and the decoder 140 as well as corresponding max pooling layers 112, 122, 132 and output layers 114, 124, and 134. The max pooling layers 112, 122, 132 operate to reduce the dimensionality of the outputs from their respective encoders by down sampling or generating pooled feature maps that highlight the most present features in the input. The output layers 114, 124, and 134 operate to generate and output the embedding vectors 115, 126, and 136 which represent a hidden embedded state used by the decode 140 to identify source code snippets which each may comprise one or more source code terms, instructions, or the like.

Each of the encoders 110-130 may themselves comprise a stack of recurrent units, long short term memory (LSTM) cells, gated recurrent unit (GRU) cells, or the like, which accept an element of an input sequence, collects information or that element, and propagates it forward. Each of the embedding vectors 116, 126, 136 generated by the respective encoders 110-130 encapsulate the information for all the input elements in order to assist the decoder 140 to make accurate predictions of the source code sequence when combined with the embedding vectors of the other encoders 110-130.

The decoder 140 may also be a stack of recurrent units where each unit predicts an output in the source code sequence 150. Each recurrent unit in the decoder 140 accepts a hidden state from the previous unit and produces an output as well as its own hidden state, where each hidden state is used by the recurrent units of the decoder 140 to predict the next state in the sequence. This output sequence is a collection of source code snippets, each source code snippet comprising one or more source code terms, instructions, or the like, for defining executable source code. The source code is specifically designed to map or translate between the source data and the destination data in their respective formats. In some illustrative embodiments, the source code generated by the decoder based on the embedding vectors 116, 126, and 136 is an open source code that is not tied to a specific EDI tool.

As shown in FIG. 1, the source code generator 100 receives as input a source document sample 102, a destination document sample 104, and a mapping requirements specification (MRS) 106. For example, the source document sample 102 may be an input transaction sample and the destination document sample 104 may be an output transaction sample. The MRS 106 may specify rules and logic that are to be applied to source documents to generate destination documents, e.g., input transactions generating output transactions. The encoders 110-130 take their respective inputs and generate embedding vectors 116, 126, 136 which capture the context and structure of the features of the respective source document 102, destination document 104, and MRS 106. Structure refers to the format, hierarchy and/or syntax. For example, in FIG. 2 it is mandatory to have a From tag first and then To tag and then Sender tag etc. As another example, the <From> tag itself has the <Credential> tag which further should include the <Identity> tag. This hierarchy and structure is learned by the encoders to correctly generate the code. Context refers to the content present around a particular tag/field. This information often can help in disambiguating conflicts of similar tags. For example, in FIG. 2, there are <Identity> tags in the <From> and <To> tags. However, from the context it is known that these identify tags have different meanings, i.e., one meaning is a "From identity" and another is "To identity". When the encoder-decoder based model has tokenized the input and is processing each tag, the encoder-decoder based model also looks at the context to fully understand the actual meaning of the tag and improve its accuracy.

The embedding vectors 116, 126, 136 comprise a vector of values in vector slots that represent these features and their context and structure as an intermediate representation. It should be appreciated that this intermediate interpretation is not a human decipherable representation, but rather a machine representation generated based on a machine learning training of the encoders 110-130, but these values allow the machine to represent the context and structure of the features in a way that the machine is able to operate on this representation using mathematical computations.

The decoder 140 uses the combined features, context, and structure embeddings represented in the embedding vectors 116, 126, and 136 to make logical connections and assimilate the rules and logic of the MRS 106 to generate a vector representation of a source code sequence 150 whose individual vector slot values can be mapped to source code snippets 160 using a source code vocabulary data structure 170 for a source code programming language of interest, e.g., an open source programming language, such as Python or the like. The logical connections and assimilation of the rules and logic of the MRS 106 are used to generate the source code 160 by outputting a vector output 150 having a sequence of values representing a sequence of source code snippets, and these values may then be mapped by the source code vocabulary 170 to the specific source code snippets that are combined in accordance with the sequence represented in the vector output 150. This source code may then be output for use in mapping source documents, such as source document 102, to the destination document, such as destination document 104, in accordance with the rules and logic specified in the MRS 106.

This process may be followed during a machine learning training operation to train the encoders 110-130 and decoder 140 to properly generate embedding vectors 116, 126, and 136 and the output vector 150 by comparing the output vector 150 to ground truth (not shown) for the training data inputs, e.g., training source document 102, training output document 104, and training MRS 106. Based on the comparison, a loss may be calculated according to a given loss function, and appropriate operational parameter modifications may be made to the encoders 110-130 and decoder 140 to minimize the loss until a convergence criterion is reached, at which point the source code generator 100 is considered to have been trained.

During runtime operation, when a user/customer wishes to have source code generated to map from a source document format to a destination document format, the user/customer need only provide the source document sample 102, the destination document sample 104, and the MRS 106, and the source code generator 100 will automatically generate the source code for performing the EDI mapping/translation from the source document to the destination document in accordance with the MRS rules/logic.

Figure 2:
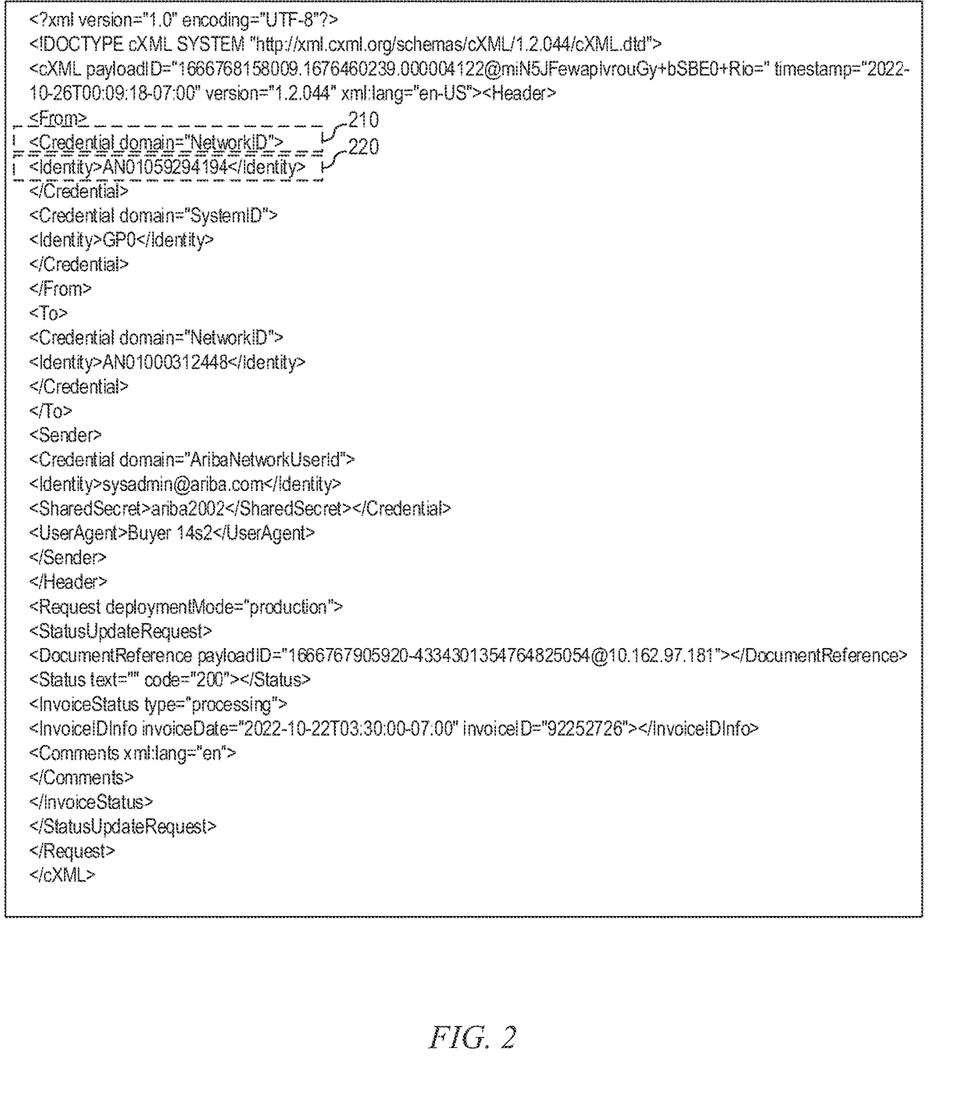
FIG. 2 is an example diagram of a sample source document specifying transaction data in a format used by a sender entity in accordance with one illustrative embodiment.

As noted above, the inputs that are provided to the source code generator 100 comprise a source document data structure 102, a destination document data structure 104, and a MRS 106. FIG. 2 is an example diagram of a sample source document specifying transaction data in a format used by a sender entity in accordance with one illustrative embodiment, which may be input to the source code generator 100 as source document data structure 102, for example. The content of the document in the example of FIG. 2 is structured, but not simple. It has complex hierarchies, and the tags have different meanings. The mechanisms of the illustrative embodiments are designed to process such complex inputs where intelligent processing is need to understand the input document properly, i.e., the artificial intelligence computer models of the illustrative embodiments.

Figure 3:
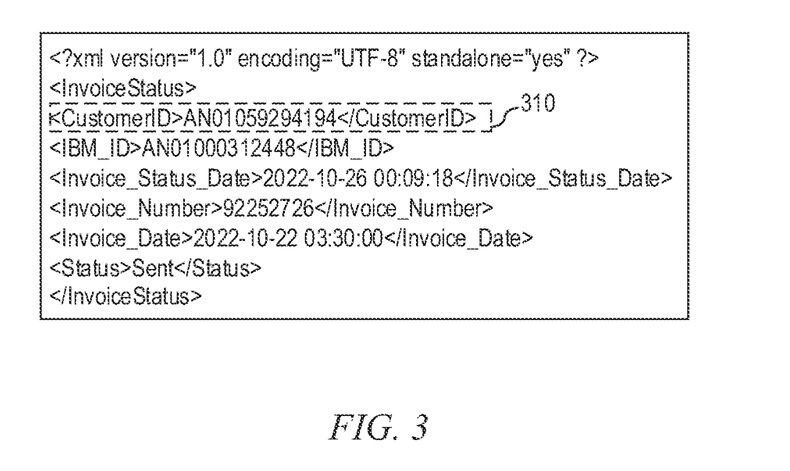
FIG. 3 is an example diagram of a sample destination document specifying transaction data in a format used by a recipient entity in accordance with one illustrative embodiment.

FIG. 3 is an example diagram of a sample destination document specifying transaction data in a format used by a recipient entity in accordance with one illustrative embodiment. Similar to FIG. 2, this document also comprises complex structures and context, but it should be noted that the structure and tags have completely changed relative to the source document shown in FIG. 2. A solution for generating such a destination document via a translation using code cannot be built without a sophisticated, intelligent computing tool, such as that presented by the illustrative embodiments.

Figure 4:
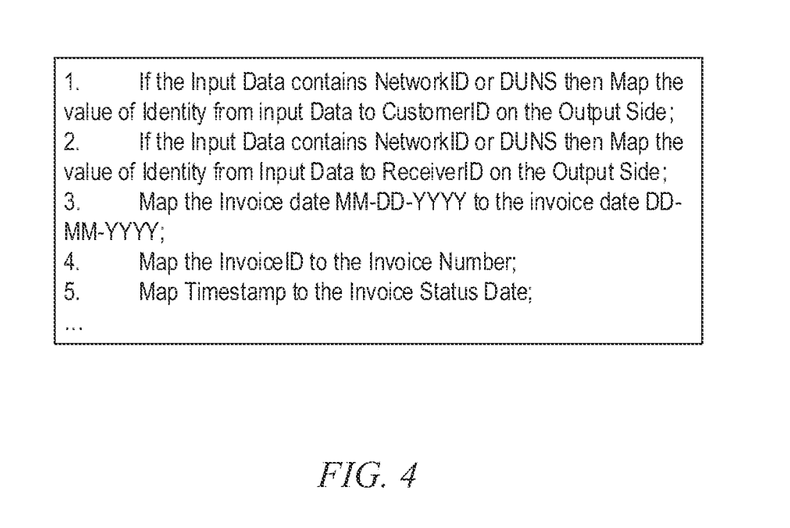
FIG. 4 is an example of rules of a mapping requirements specification (MRS) file in accordance with one illustrative embodiment.

FIG. 4 is an example of rules of a mapping requirements specification (MRS) file in accordance with one illustrative embodiment. As shown in FIG. 4, the rules and logic of the MRS file may be provided in a natural language format and specify criteria for mapping elements from the source document format (see FIG. 2) to the destination document format (see FIG. 3). For example, one rule may be that if the input data contains a NetworkID or DUNS, then the value of Identity in the source document is mapped from Input to CustomerID on the output side. As seen in FIG. 2, the source document includes a NetworkID 210, and thus, the Identity 220 value, e.g., "AN01059294194" is mapped from this input to the CustomerID 310. Similar rules, such as those shown in FIG. 4 and others, may further specify how the source document format is to be mapped to the destination document format to thereby map/translate a source document such as shown in FIG. 2 to the destination document such as shown in FIG. 3.

Figure 5:
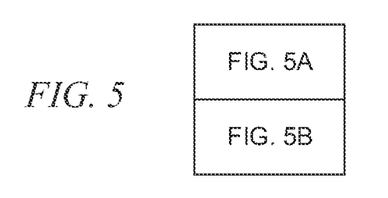
Figure 5A:
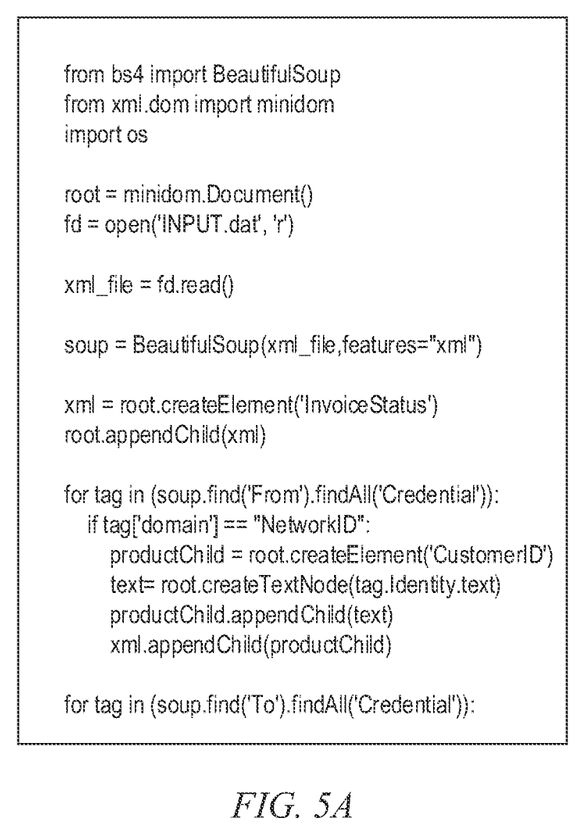
FIG. 5A is a first portion of the source code and FIG. 5B is a second portion of the source code.
Figure 5B:
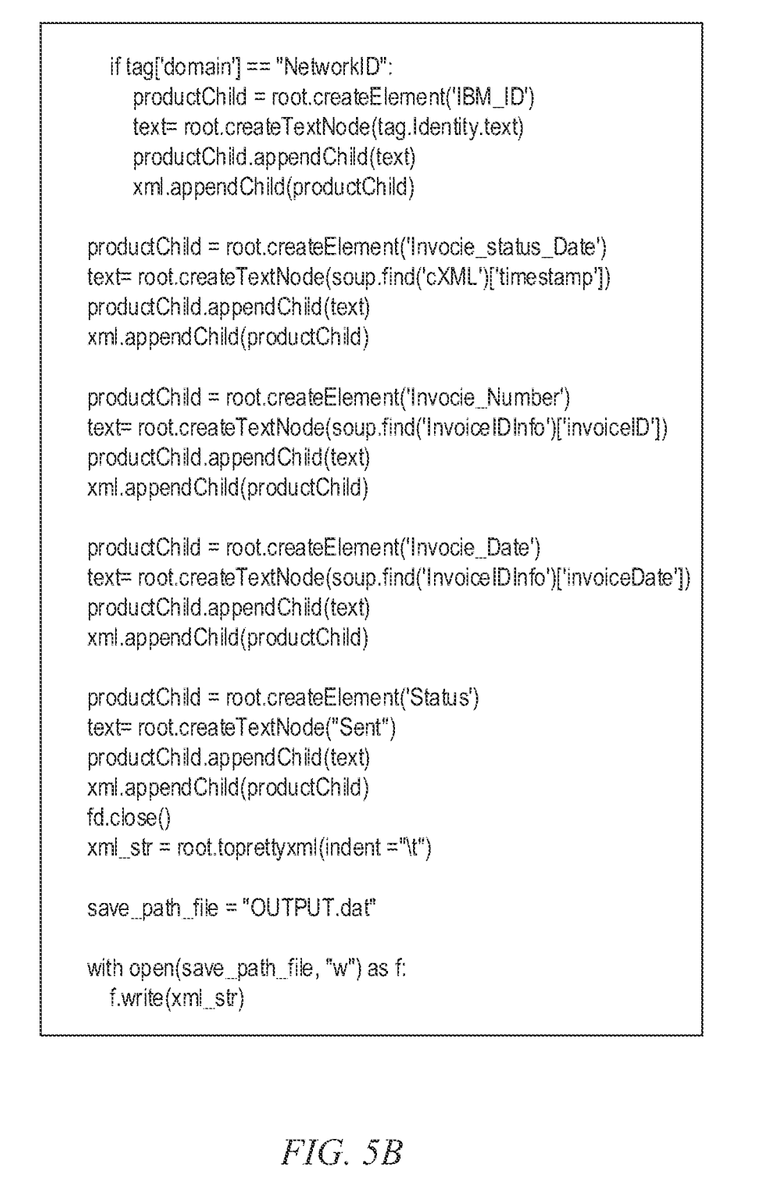

FIG. 5, comprising FIGS. 5A and 5b, is an example of an automatically generated source code for EDI mapping as may be generated by an automated EDI mapping source code generator computer model in accordance with one illustrative embodiment, where FIG. 5A is a first portion of the source code and FIG. 5B is a second portion of the source code. This source code is generated by the source code generator 100 based on a given source document, such as the example of FIG. 2, a given destination document, such as the example of FIG. 3, and a MRS file comprising rules/logic for implementing the mapping/translation, such as the example shown in FIG. 4. The source code in FIG. 5 implements the rules/logic of the MRS file on the particular source document format to generate the destination document format. Thus, by executing this source code on a given source document, the destination document is automatically generated in accordance with the MRS rules/logic. Hence, manual EDI mappings are no longer needed and instead all one needs to do is specify MRS rules/logic, an source document sample, and a destination document sample, and the automated computing tool of the illustrative embodiments automatically generates the source code for performing the EDI mapping/translation which can then be automatically executed on source documents to generate destination documents for electronic data interchange.

Figure 6:
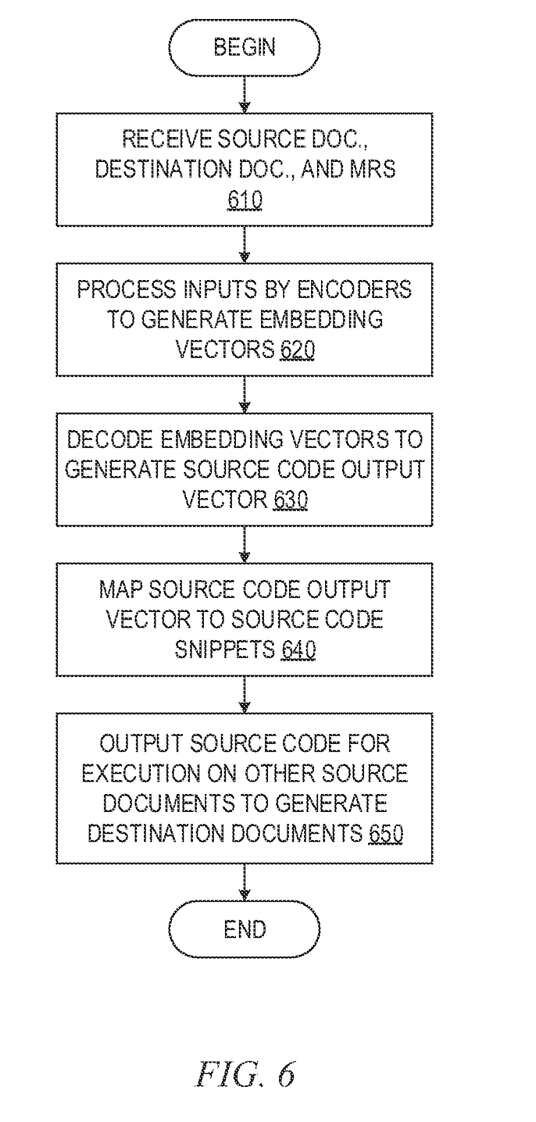
FIG. 6 is a flowchart outlining an example operation of an automated EDI mapping source code generator computer model in accordance with one illustrative embodiment.

FIG. 6 is a flowchart outlining an example operation of elements of the present invention with regard to one or more illustrative embodiments. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

FIG. 6 is a flowchart outlining an example operation of an automated EDI mapping source code generator computer model in accordance with one illustrative embodiment. The operation in FIG. 6 assumes a previous training of the source code generator based on training data and ground truth data such that the source code generator is trained through machine learning processes to embed features and context of a source document, destination document, and MRS and decode the embeddings into a source code sequence, as previously described above.

As shown in FIG. 6, the operation starts by receiving a source document, destination document and MRS (step 610). These inputs are processed by respective encoders to generate embedding vectors (step 620). The embedding vectors are input to the source code generation decoder which generates a vector output comprising a sequence of values corresponding to source code snippets (step 630). The vector output is then mapped to source code snippets using a source code vocabulary for the particular source code programming language (step 640). The resulting source code is then output for execution on documents (step 650) and the operation terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides automated artificial intelligence based EDI mapping/translation source code generation for mapping/translating from one document format to another. The improved computing tool implements mechanism and functionality, such as the source code generator 100 in FIG. 1, which cannot be practically performed by human beings either outside of, or with the assistance of, a technical environment, such as a mental process or the like. The improved computing tool provides a practical application of the methodology at least in that the improved computing tool is able to automatically generate source code that performs EDI mapping/translation for a given source document format and destination document format which implements the rules/logic of a given mapping requirements specification (MRS). In this way, the costly and manual process of generating and maintaining EDI mappings is eliminated.

Figure 7:
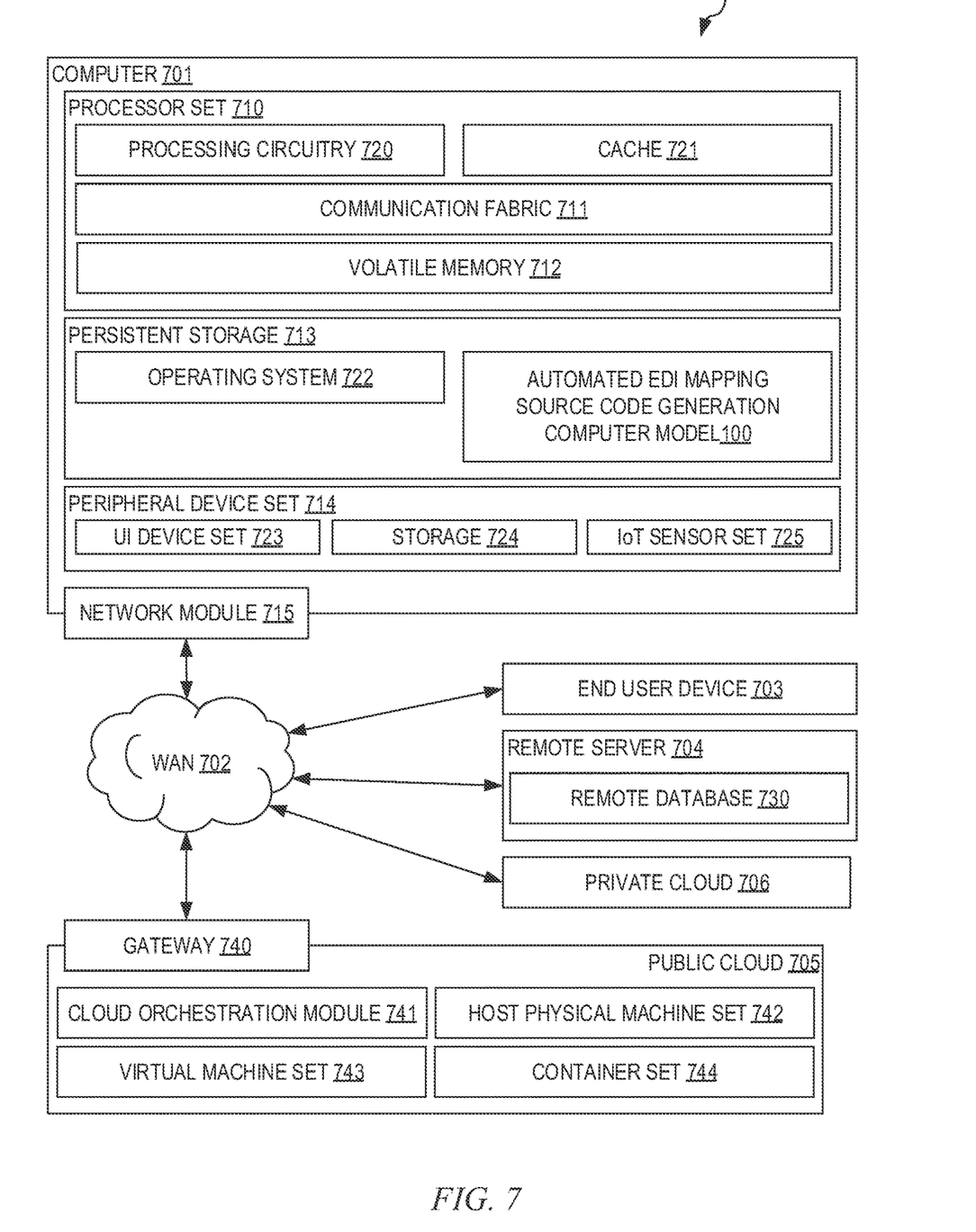
FIG. 7 is an example diagram of a distributed data processing system environment in which aspects of the illustrative embodiments may be implemented and at least some of the computer code involved in performing the inventive methods may be executed.

FIG. 7 is an example diagram of a distributed data processing system environment in which aspects of the illustrative embodiments may be implemented and at least some of the computer code involved in performing the inventive methods may be executed. That is, computing environment 700 contains an example of an environment for the execution of at least some of the computer code involved in performing the inventive methods, such as 100. In addition to block 100, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 200, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 200 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 200 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704 may be specifically configured to implement a automated EDI mapping source code generator computer model, such as 100 in FIG. 1. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automated source code generation for performing EDI mappings/translations between source document formats and destination document formats in compliance with rules and logic specified in a MRS file.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for generating electronic data interchange mapping source code, the method comprising:
   receiving, in a source code generator comprising a machine learning trained neural network computer model, input data comprising a source document data structure in a first format and a destination document data structure in a second format, different from the first format;
   processing, by the source code generator, the input data to generate a source code sequence output vector;
   generating a source code that maps contents of source documents in the first format to contents of destination documents in the second format based on the source code sequence output vector; and
   outputting the source code to a computing device for execution on other source documents that utilize the first format to thereby automatically generate corresponding destination documents in the second format, wherein generating the source code comprises mapping values in the source code sequence output vector to source code snippets based on a source code vocabulary data structure.

2. The method of claim 1, wherein the input data further comprises a mapping requirements specification (MRS) file comprising a definition of at least one rule for mapping from the first format of the source document data structure to the second format of the destination document data structure, and wherein mapping values is performed in accordance with the at least one rule for mapping specified in the MRS file.

3. The method of claim 2, wherein the machine learning trained neural network computer model comprises three encoders and one decoder, wherein a first encoder encodes the source document data structure into a first vector output, a second encoder encodes the destination document into a second vector output, and the third encoder encodes the MRS file into a third vector output, and wherein the decoder combines the first, second, and third outputs and generates the source code sequence output vector.

4. The method of claim 3, wherein the first vector output, second vector output, and third vector output are embedding vectors that capture context and structure of input features, wherein the structure comprises a hierarchy of tags or fields within input data, and wherein the context comprises content present around the tags or fields within the input data.

5. The method of claim 3, wherein the first encoder, second encoder, third encoder, and decoder are trained by executing a machine learning training operation using training data comprising a plurality of first document data structures in the first format, and a plurality of second documents in the second format.

6. The method of claim 3, wherein the first encoder, second encoder, third encoder, and decoder are recurrent neural networks.

7. The method of claim 1, wherein the machine learning trained neural network computer model is specifically trained for a pairing of the first format and the second format, and wherein there are a plurality of machine learning trained neural network computer models for a plurality of different pairings of formats.

8. The method of claim 1, wherein a sequence of vector slot values in the source code sequence output vector corresponds to a sequence of source code snippets such that a sequence of source code snippets in the source code has a same sequence as the sequence of vector slot values.

9. The method of claim 1, wherein the computing device comprises an electronic data interchange computing device, of a first organization, that operates to translate the other source documents into corresponding destination documents associated with another computing system, of a second organization.

10. A computer program product comprising a computer readable storage medium having a computer readable program stored therein, wherein the computer readable program, when executed on a data processing system, causes the data processing system to:
receive, in a source code generator comprising a machine learning trained neural network computer model, input data comprising a source document data structure in a first format and a destination document data structure in a second format, different from the first format;
process, by the source code generator, the input data to generate a source code sequence output vector;
generate a source code that maps contents of source documents in the first format to contents of destination documents in the second format based on the source code sequence output vector; and
output the source code to a computing device for execution on other source documents that utilize the first format to thereby automatically generate corresponding destination documents in the second format, wherein generating the source code comprises mapping values in the source code sequence output vector to source code snippets based on a source code vocabulary data structure.

11. The computer program product of claim 10, wherein the input data further comprises a mapping requirements specification (MRS) file comprising a definition of at least one rule for mapping from the first format of the source document data structure to the second format of the destination document data structure, and wherein mapping values is performed in accordance with the at least one rule for mapping specified in the MRS file.

12. The computer program product of claim 11, wherein the machine learning trained neural network computer model comprises three encoders and one decoder, wherein a first encoder encodes the source document data structure into a first vector output, a second encoder encodes the destination document into a second vector output, and the third encoder encodes the MRS file into a third vector output, and wherein the decoder combines the first, second, and third outputs and generates the source code sequence output vector.

13. The computer program product of claim 12, wherein the first vector output, second vector output, and third vector output are embedding vectors that capture context and structure of input features, wherein the structure comprises a hierarchy of tags or fields within input data, and wherein the context comprises content present around the tags or fields within the input data.

14. The computer program product of claim 12, wherein the first encoder, second encoder, third encoder, and decoder are trained by executing a machine learning training operation using training data comprising a plurality of first document data structures in the first format, and a plurality of second documents in the second format.

15. The computer program product of claim 10, wherein the machine learning trained neural network computer model is specifically trained for a pairing of the first format and the second format, and wherein there are a plurality of machine learning trained neural network computer models for a plurality of different pairings of formats.

16. The computer program product of claim 10, wherein a sequence of vector slot values in the source code sequence output vector corresponds to a sequence of source code snippets such that a sequence of source code snippets in the source code has a same sequence as the sequence of vector slot values.

17. The computer program product of claim 10, wherein the computing device comprises an electronic data interchange computing device, of a first organization, that operates to translate the other source documents into corresponding destination documents associated with another computing system, of a second organization.

18. An apparatus comprising:
at least one processor; and
at least one memory coupled to the at least one processor, wherein the at least one memory comprises instructions which, when executed by the at least one processor, cause the at least one processor to:
receive, in a source code generator comprising a machine learning trained neural network computer model, input data comprising a source document data structure in a first format and a destination document data structure in a second format, different from the first format;
process, by the source code generator, the input data to generate a source code sequence output vector;
generate a source code that maps contents of source documents in the first format to contents of destination documents in the second format based on the source code sequence output vector; and
output the source code to a computing device for execution on other source documents that utilize the first format to thereby automatically generate corresponding destination documents in the second format, wherein generating the source code comprises mapping values in the source code sequence output vector to source code snippets based on a source code vocabulary data structure.

* * * * *